(12) United States Patent
Ress

(10) Patent No.: US 10,247,244 B2
(45) Date of Patent: Apr. 2, 2019

(54) BEARING ASSEMBLY

(71) Applicant: Aktiebolaget SKF, Gothenburg (SE)

(72) Inventor: Andre Ress, Oberelsbach (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/724,549

(22) Filed: Oct. 4, 2017

(65) Prior Publication Data

US 2018/0100546 A1 Apr. 12, 2018

(30) Foreign Application Priority Data

Oct. 7, 2016 (DE) .......................... 10 2016 219469

(51) Int. Cl.
| | |
|---|---|
| *F16C 33/78* | (2006.01) |
| *F16C 33/76* | (2006.01) |
| *F16C 19/06* | (2006.01) |

(52) U.S. Cl.
CPC ............ *F16C 33/763* (2013.01); *F16C 19/06* (2013.01); *F16C 33/782* (2013.01)

(58) Field of Classification Search
CPC ....... F16C 33/763; F16C 33/782; F16C 19/06
See application file for complete search history.

(56) References Cited

U.S. PATENT DOCUMENTS

| | | | | |
|---|---|---|---|---|
| 3,602,559 A | * | 8/1971 | Hirschler | ............ F16C 33/6618 |
| | | | | 277/420 |
| 4,368,933 A | * | 1/1983 | Motsch | ................ F16C 33/723 |
| | | | | 384/130 |
| 5,328,276 A | * | 7/1994 | Linteau | ................ F16C 23/084 |
| | | | | 384/477 |
| 5,678,934 A | * | 10/1997 | Fischer | ................ F16C 23/084 |
| | | | | 384/489 |
| 7,448,807 B2 | * | 11/2008 | Schenk | ................ F16C 13/006 |
| | | | | 384/417 |
| 2003/0039422 A1 | * | 2/2003 | Nisley | ..................... F16C 33/76 |
| | | | | 384/477 |

* cited by examiner

*Primary Examiner* — Thomas R Hannon
(74) *Attorney, Agent, or Firm* — Bryan Peckjian; SKF USA Inc. Patent Dept.

(57) ABSTRACT

A bearing assembly includes a housing having a flange at a first axial side and a bearing attachment section at a second axial side and a rolling-element bearing having inner and outer rings and a plurality of rolling elements. The rings are sealed on first and second axial sides by first and second seal disks, and the outer ring is pivotably mounted in the attachment section of the housing and the inner ring is configured to be mounted on a shaft. The assembly also includes a seal assembly configured to form a seal between the flange and the shaft at the first axial side of the housing, an end cover, an O-ring compressed between the second axial side of the housing and the end cover and at least one seal barrier between the seal assembly and the first seal disk and/or between the cover and the second seal disk.

14 Claims, 3 Drawing Sheets

BEARING ASSEMBLY

CROSS-REFERENCE

This application claims priority to German patent application no. 10 2016 219 469.0 filed on Oct. 7, 2016, the contents of which are fully incorporated herein by reference.

TECHNOLOGICAL FIELD

The disclosure relates to a bearing assembly including a rolling-element bearing sealed on both sides by a first and a second seal disc, which rolling-element bearing includes a plurality of rolling elements rolling between an inner ring and an outer ring, wherein the outer ring of the bearing assembly is received in an attachment section of a housing in a slightly pivotable manner with respect to a longitudinal central axis of the bearing assembly, and the inner ring is disposed on a to-be-supported shaft.

BACKGROUND

Sealed rolling-element bearings or bearing assemblies are known from the prior art in a wide range of variation. Such rolling-element bearings are preferably used for bearing applications under particularly harsh conditions, such as prevail, for example, in agriculture.

It is disadvantageous inter alia that conventionally sealed rolling-element bearings have only a short service life since water and dirt particles enter therein can lead to increased corrosion and/or the washing-out of the bearing grease.

SUMMARY

It is therefore an aspect of the disclosure to provide a sealed bearing assembly that is suited for long-term use under adverse operating conditions and for this purpose is particularly reliably protected against the penetration of water and dirt particles that may possibly enter thereinto.

This is first achieved by a bearing assembly wherein a flange of the housing is sealed with respect to the shaft by a seal assembly, and on a free end of the attachment section of the housing, which free end is directed away from the flange, an end-side cover is attachable to a seal element, in particular an O-ring, in a tightly sealing manner, and an interior of the housing includes at least one seal barrier.

A more effective, more reliable protecting of the bearing assembly from the penetrating of water, spray water, and dirt particles is thereby provided. Here the cover preferably completely covers a free shaft end of a shaft supported by the bearing assembly. Each of the two seal discs of the bearing assembly is preferably respectively provided with a centrifugal disc.

Preferably the at least one seal barrier is formed by a grease having a high consistency class.

The penetrating of water and/or of dirt particles carried in water into the bearing assembly is further impeded by the grease. In addition, in the ideal case the grease serving as an additional seal barrier fills all the cavities inside of the housing of the bearing assembly, into which cavities water and/or dirt particles could enter. In the context of the present description the term a "high consistency class" defines a grease having a consistency class of at least 2 or higher.

In the case of a further development the seal assembly closes flush with a base surface of the flange of the housing.

A problem-free installing of the bearing assembly onto a machine component is thereby provided with a smallest-possible change of the structural height.

In the case of a technically advantageous design the outer ring has a convex outer surface for at least axial position-securing in a correspondingly designed retaining surface of the attachment section of the flange.

At least a slight transverse-axial offset can thereby be compensated for a further bearing assembly for the shaft, which bearing assembly is disposed axially spaced. For this purpose the retaining surface has a surface geometry corresponding to the convex outer surface of the outer ring.

In a favorable further development an inner circumferential groove including a projection at least sectionally encircling and directed radially inwards is formed on the free end of the attachment section of the flange.

As a result thereof a reliable attaching of the cover is realizable since it can engage behind the encircling projection.

The cover is preferably configured essentially pot-shaped, including a base and a wall connecting thereto axially and encircling, wherein an outer circumferential groove for receiving the seal element is formed on a free end section of the wall.

As a result thereof, in addition to the left-side sealing of the bearing assembly, with the help of the seal assembly a right-side, hermetically tightly sealed closing of the bearing assembly is also provided.

In one advantageous further development of the bearing assembly the free end section of the wall includes an at least sectionally encircling and radially outwardly directed retaining projection, which is engageable with the projection on the inner circumferential groove of the attachment section of the flange, in particular is latchable thereto, for attaching the cover.

A rapid and simple attachment possibility of the end-side cover to the housing of the bearing assembly is thereby provided.

According to a further development at least three slots extending essentially parallel to the longitudinal central axis are provided in the region of the free end section of the wall of the cover.

As a result thereof, in the latching-on process onto the housing of the bearing assembly the free end section of the cover can deflect radially inward and outward again with a low application of force.

In one technically advantageous further development the shaft is connectable using at least one attachment means to the inner ring such that they rotate together.

Due to the fixed clamping of the inner ring on the shaft or the clamping of the shaft in the inner ring using at least one attachment means, a reliable and yet also rapidly and removably detachable axial position-securing of the shaft is realizable using the disclosed bearing assembly. Hexagon socket screws having an external thread (so-called "grub screws") are preferably used as attachment means.

DETAILED DESCRIPTION

Figure 1:
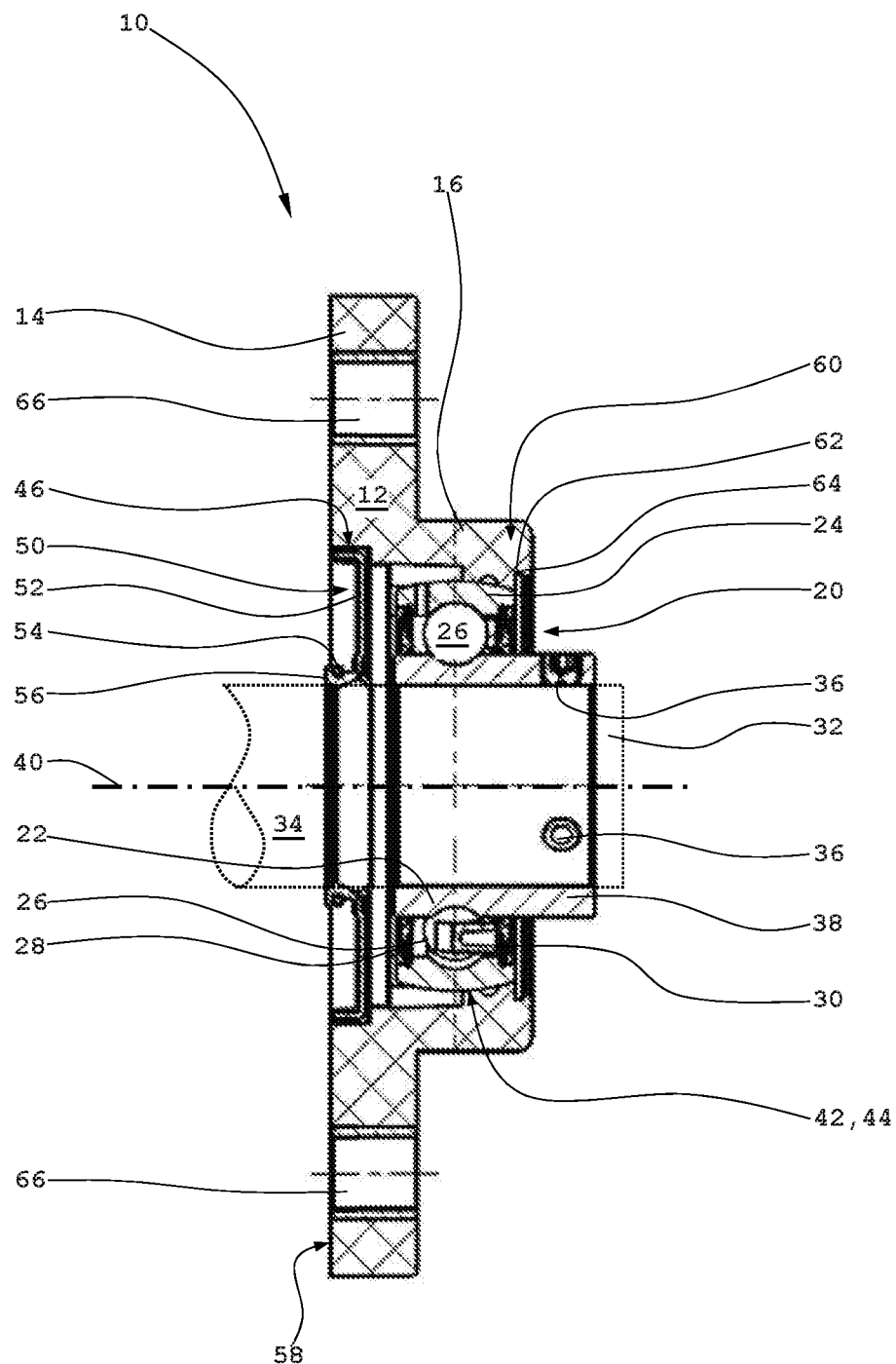
FIG. 1 shows a longitudinal section of a bearing assembly without an end-side cover.

In the drawings the same structural elements each have the same reference number.

FIG. 1 shows a longitudinal section of a bearing assembly without an end-side cover.

A bearing assembly 10 comprises inter alia a housing 12 including a flange 14, here exemplarily circular-ring-shaped, as well as an essentially hollow-cylindrical attachment section 16 connected axially thereto. Alternatively the flange 14 can also have an oval, elliptical, or polygonal shape having at least three sides. In the region of the attachment section 16 a rolling-element bearing 20 including an inner ring 22 and an outer ring 24, between which a plurality of rolling elements 26 roll, is received in the housing 12. On both sides of the rolling elements 26 a first and second seal disc 28, 30 are provided between the inner ring 22 and the outer ring 24 for optimizing the protection of the rolling-element bearing 20 against damaging environmental influences, in particular the protection against water and dirt particles possibly contained therein. In addition, a not-shown centrifugal disc is associated with each of the two seal discs 28, 30. The essentially hollow-cylindrical inner ring 22 has a greater width than the outer ring 24 and is received on a shaft end 32 of a shaft 34 to be supported by the bearing assembly 10. The axial position-securing of the shaft 34 is preferably effected by at least two attachment means not depicted for better illustration clarity, in particular by hexagon socket screws having external threads (so-called "grub screws") or the like, which are screwable into two threaded bores 36 only exemplarily depicted here. Here the threaded bores 36 are positioned in a free end section 38 of the tubular inner ring 22, which end section 38 is spaced away from the flange 14 and which protrudes axially over the attachment section 16. The bearing assembly 10 is rotationally symmetric with respect to a longitudinal central axis 40, and the rolling-element bearing 20 is only exemplarily embodied here as a cage-guided deep groove ball bearing.

A radially outwardly directed, slightly convex outer surface 42 of the outer ring 24 is received in a retaining surface 44 of the attachment section 16, which retaining surface 44 is formed complementary to the outer surface 42 of the outer ring 24, with the result that a slight pivotability of the outer ring 24 is provided with respect to the longitudinal central axis 40 and thus in relation to the housing 12 of the bearing assembly 10. There is at least a slight press fit between the outer ring 24 and the retaining surface 44 of the attachment section 16. A slight transverse-axial axial offset with respect to a further bearing assembly can thereby be compensated.

An inner circumferential groove 46 or a recess is provided in the flange 12 in which a seal assembly 50 is attached for sealing the housing 12 with respect to the shaft 34. The seal assembly 50 exemplarily comprises an approximately circular-ring-shaped holder 52, on whose circular opening an encircling seal lip 54 is disposed, which is pressed radially inward against the shaft 34 by an encircling tensioning element 56, for example, a cylinder spring, a ring spring, or the like. A reliable sealing in the region of a circular-ring-shaped base surface 58 of the flange 14 of the housing 12 of the bearing assembly 10 against the penetrating of water and dirt particles is thereby initially provided.

An inner circumferential groove 62 for preferably latch-end snapping attachment of a pot-shaped cover (see in particular FIGS. 2, 3) is embedded into a free end 60 of the attachment section 16 and for this purpose includes a radially inwardly directed and at least sectionally configured projection 64.

The flange 14 is provided with a plurality of cylindrical, thread-free attachment bores preferably uniformly circumferentially spaced from one another, of which here only two attachment bores 66 are depicted.

Figure 2:
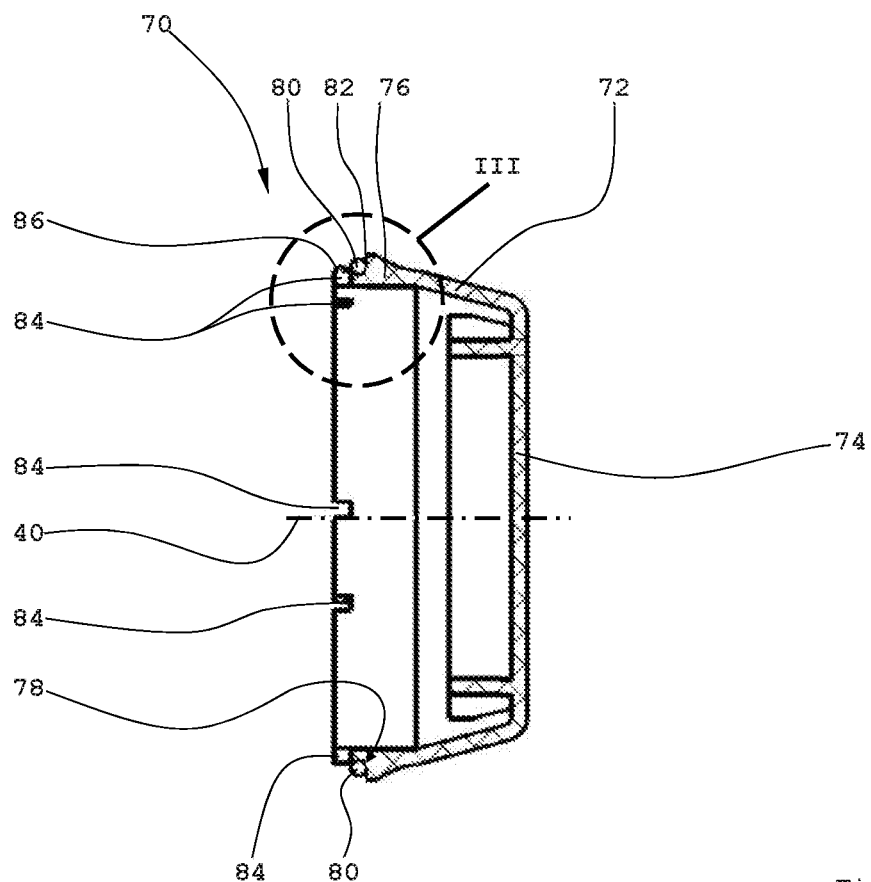
FIG. 2 shows a longitudinal section of a cover.

FIG. 2 illustrates a longitudinal section of a cover.

A cover 70 or cover cap rotationally symmetric to the longitudinal central axis 40 has approximately a pot-shaped geometry with a slightly conical encircling wall 72, whose not-depicted smaller-diameter opening is closed by a circular base 74.

In the region of a free axial end section 76 of the wall 72 an outer circumferential groove 78 is formed having an approximately quarter-circle-shaped cross-sectional geometry for receiving a seal element 80, in particular an O-ring or the like. The outer circumferential groove 78 in turn merges into a shoulder 82 that extends radially outward and perpendicular to the longitudinal central axis 40. Furthermore, a plurality of slots 84 preferably uniformly circumferentially spaced with respect to each other is provided in the free end section in order to facilitate the latching of the cover 70 to the housing 12 of the bearing assembly 10 by radially inwardly deflecting the free end section 76. The slots 84 each have an approximately rectangular geometry whose longitudinal axes extend parallel to the longitudinal central axis 40. In addition, an at least sectionally encircling, radially outwardly directed retaining projection 86 is formed on the free end section 76 of the wall 72.

Figure 3:
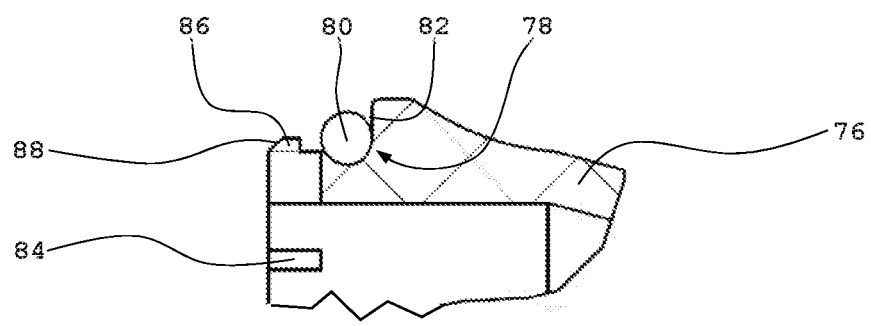
FIG. 3 shows an enlarged depiction of the section III of FIG. 2.

FIG. 3 shows an enlarged depiction of section III of FIG. 2.

The outer circumferential groove 78 is embedded in the free end section 76 of the wall of the cover 70 where the O-ring 80 is located. Like the one-side-open slot 84, a slip chamfer 88 of the retaining projection 86 faces toward the housing not depicted here of the bearing assembly.

Due to the shoulder 82 an axial spreading of the toroidal seal element 80 is avoided during the connecting or the latching of the cover to the housing of the bearing assembly, while at the same time a sufficient deformation of the seal element 80 is ensured for providing an optimal sealing effect against spray water and dirt particles possible contained therein. In addition, due to the elastic deformation of the seal element 80 during latching of the cover 70 onto the housing of the bearing assembly and due to the dimensioning of the wedge-shaped retaining projection 86, the shoulder 82 and the outer circumferential groove 78 an axial preload occurs, which provides a particularly reliable seating of the cover 70.

Figure 4:
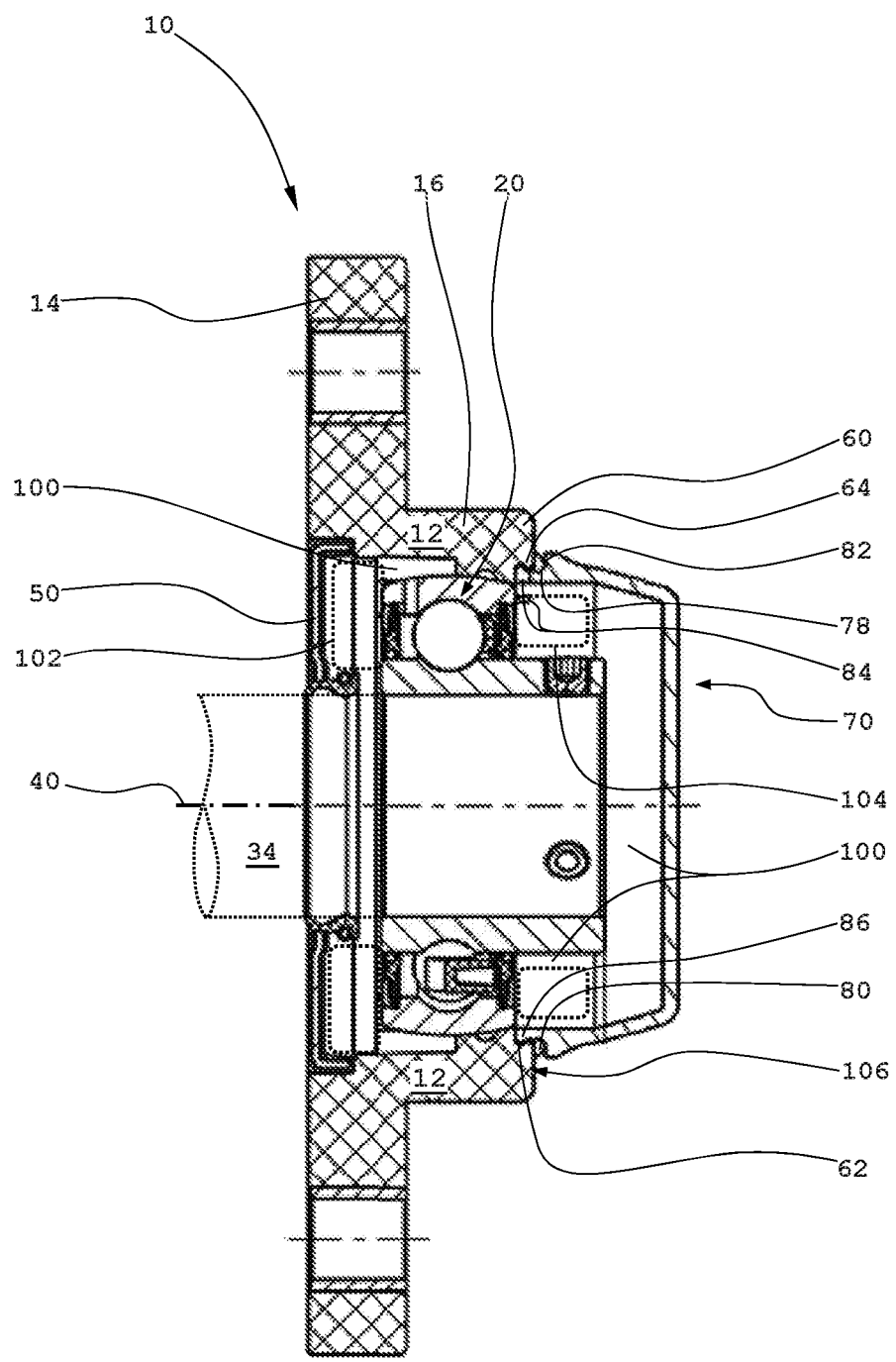
FIG. 4 shows the longitudinal section of the bearing assembly of FIG. 1 with the cover of FIG. 2.

FIG. 4 shows the longitudinal section of the bearing assembly of FIG. 1 with the cover of FIG. 2.

The cover 70 is latched to the free end 60 of the attachment section 16 of the housing 12 of the bearing assembly 10, and the rear-side seal assembly 50 ends flush with the flange 14. The rolling-element bearing 20 is located in an interior 100 of the housing 12. In the interior 100 a seal barrier 102, 104 is respectively provided in a region between the seal assembly 50 with the shaft 34 and the rolling-element bearing 20 as well as between this and the cover 70, which serves for further increasing of the resistance of the bearing assembly 10 against damaging environmental influences, such as, for example, water and dirt particles carried therein. For this purpose the seal barriers 102, 104 are formed by a grease having a consistency class of 2 or higher, and in the ideal case completely fill the interior 100 between the seal assembly 50 and the rolling-element bearing 20 as well as between this and the cover 70.

The attaching of the cover 70 to the free end 60 of the attachment section 16 of the housing 12 of the bearing assembly 10 is effected with the help of the retaining projection 86 formed on the cover 70 which are latched into or at least sectionally received in an interference-fit manner into the inner circumferential groove 62. At the same time the seal element 80 or the O-ring is fixedly axially compressed against an end surface 106 of the free end 60 of the attachment section 16, which end surface 106 extends perpendicular to the longitudinal center axis 40, whereby a hermetic sealing effect of the cover 70 against water and dirt particles possibly carried therein is ensured. At the same time, due to this axial preload between the cover 70 and the housing 10 a particularly reliable mechanical seating is achieved of the cover 70 on the free end 60 of the attachment section 16 of the housing 12 of the bearing assembly 10. At the same time the cover can also be easily removed again, for example, for maintenance- or repair-purposes.

As an alternative to the latching connection merely exemplarily described here between the cover 70 and the housing 12 of the bearing assembly 10, the attaching of the cover 70 to the housing 12 can also be configured, for example, in the manner of a bayonet connection.

The bearing assembly 10 comprises a triple sealing system, which is formed by the seal discs not indicated here of the rolling-element bearing 20, the two-sided seal barriers 102, 104, as well as the cover 70 including the seal means 80 or the O-ring.

The disclosed bearing assembly 10 is thereby also suitable for long-term use in difficult environments, such as, for example, in agricultural machines, wherein the bearing assembly is often exposed to water or spray water including proportions of dirt particles.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Bearing Assembly
12 Housing
14 Flange
16 Attachment section
20 Rolling-element bearing
22 Inner ring
24 Outer ring
26 Rolling element
28 First seal disc
30 Second seal disc
32 Shaft end
34 Shaft
36 Threaded bore
38 End section (inner ring)
40 Longitudinal central axis
42 Outer surface (outer ring)
44 Retaining surface (attachment section)
46 Inner circumferential groove (flange)
50 Seal assembly
52 Holder (seal element)
54 Seal lip
56 Tensioning element
58 Base surface (flange)
60 Free end (attachment section)
62 Inner circumferential groove
64 Projection (attachment section)
66 Attachment bore
70 Cover
72 Wall
74 Base (cover)
76 Free end section (wall)
78 Outer circumferential groove (wall)
80 Seal element (O-ring)
82 Shoulder
84 Slot
86 Retaining projection (wall)
88 Slip chamfer
100 Interior
102 Seal barrier
104 Seal barrier
106 End surface (attachment section)

What is claimed is:

1. A bearing assembly comprising:
   a housing having a flange at a first axial side and a bearing attachment section at a second axial side;
   a rolling-element bearing including an inner ring, an outer ring, a plurality of rolling elements between the inner ring and the outer ring, a first seal disk extending from the inner ring to the outer ring on a first side of the rolling elements and a second seal disk extending from the inner ring to the outer ring on a second side of the rolling elements, the outer ring being pivotably mounted in the attachment section of the housing, and the inner ring being configured to be mounted on a shaft;
   a seal assembly axial spaced from the first seal disk and being configured to form a first seal between the flange and the shaft at the first axial side of the housing;
   an end cover axially spaced from the second seal disk;
   an O-ring compressed between the second axial side of the housing and the end cover to form a second seal between the housing and the cover; and
   at least one seal barrier between the seal assembly and the first seal disk and/or between the cover and the second seal disk.

2. The bearing assembly according to claim 1, wherein the at least one seal barrier comprises a grease.

3. The bearing assembly according to claim 2, wherein the grease has a consistency class of 2 or greater.

4. The bearing assembly according to claim 3,
wherein the seal assembly ends flush with the first side of the flange of the housing,
wherein the outer ring has a convex outer surface and the bearing attachment section has a complementary convex inner surface in contact with the convex outer surface,
wherein the attachment section includes a radially inwardly directed circumferential groove and wherein a retaining projection of the end cover is mounted in the radially inwardly directed circumferential groove, and
wherein the end cover is substantially pot-shaped and includes an axial wall having a base an outwardly directed circumferential groove, wherein the O-ring is mounted in the outwardly directed circumferential groove.

5. The bearing assembly according to claim 4,
wherein the base of the cover includes at least three slots extending substantially parallel to a longitudinal central axis of the shaft, and
including attachment means for attaching the inner ring to the shaft.

6. The bearing assembly according to claim 1 wherein the seal assembly ends flush with the first side of the flange of the housing.

7. The bearing assembly according to claim 1, wherein the outer ring has a convex outer surface and the bearing attachment section has a complementary convex inner surface in contact with the convex outer surface.

8. The bearing assembly according to claim 1, wherein the attachment section includes a radially inwardly directed circumferential groove and wherein a retaining projection of the end cover is mounted in the radially inwardly directed circumferential groove.

9. The bearing assembly according to claim 1, wherein the end cover is pot-shaped and includes an axial wall having a base and an outwardly directed circumferential groove, wherein the O-ring is mounted in the outwardly directed circumferential groove.

10. The bearing assembly according to claim 9, wherein the base of the cover includes at least three slots extending substantially parallel to a longitudinal central axis of the shaft.

11. The bearing assembly according to claim 9, including attachment means for attaching the inner ring to the shaft.

12. The bearing assembly according to claim 1 including the shaft.

13. The bearing assembly according to claim 12, wherein the first axial side of the housing has a substantially planar outer surface and an opening.

14. A bearing assembly comprising:
a housing having a flange at a first axial side and a bearing attachment section at a second axial side, the first axial side having a substantially planar outer surface and an opening;
a shaft;
a rolling-element bearing including an inner ring, an outer ring, a plurality of rolling elements between the inner ring and the outer ring, a first seal disk extending from the inner ring to the outer ring on a first side of the rolling elements and a second seal disk extending from the inner ring to the outer ring on a second side of the rolling elements, the outer ring being pivotably mounted in the attachment section of the housing, and the inner ring being mounted on the shaft;
a seal disk mounted entirely in the opening and forming a seal between the flange and the shaft at the first axial side of the housing;
an end cover at the second axial side of the housing;
an O-ring compressed between the second axial side of the housing and the end cover to form a seal between the housing and the cover; and
a first body of grease between the seal assembly and the first seal disk and a second body of grease between the cover and the second seal disk.

\* \* \* \* \*